Oct. 13, 1931.  H. C. KOCH  1,826,889
CUTTER HEAD
Original Filed Dec. 31, 1926   3 Sheets-Sheet 1
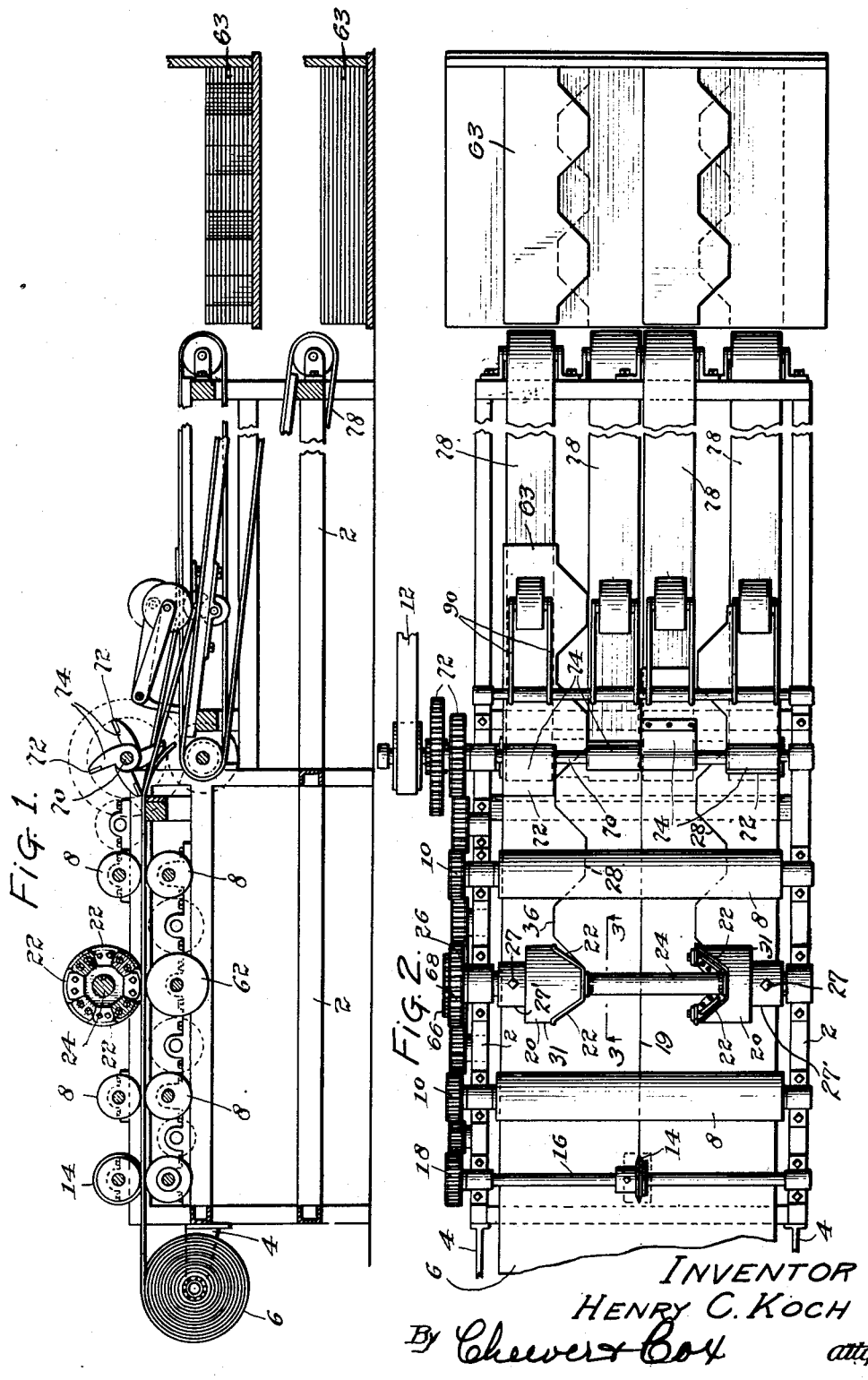
INVENTOR
HENRY C. KOCH
By Cheever+Cox
attys.

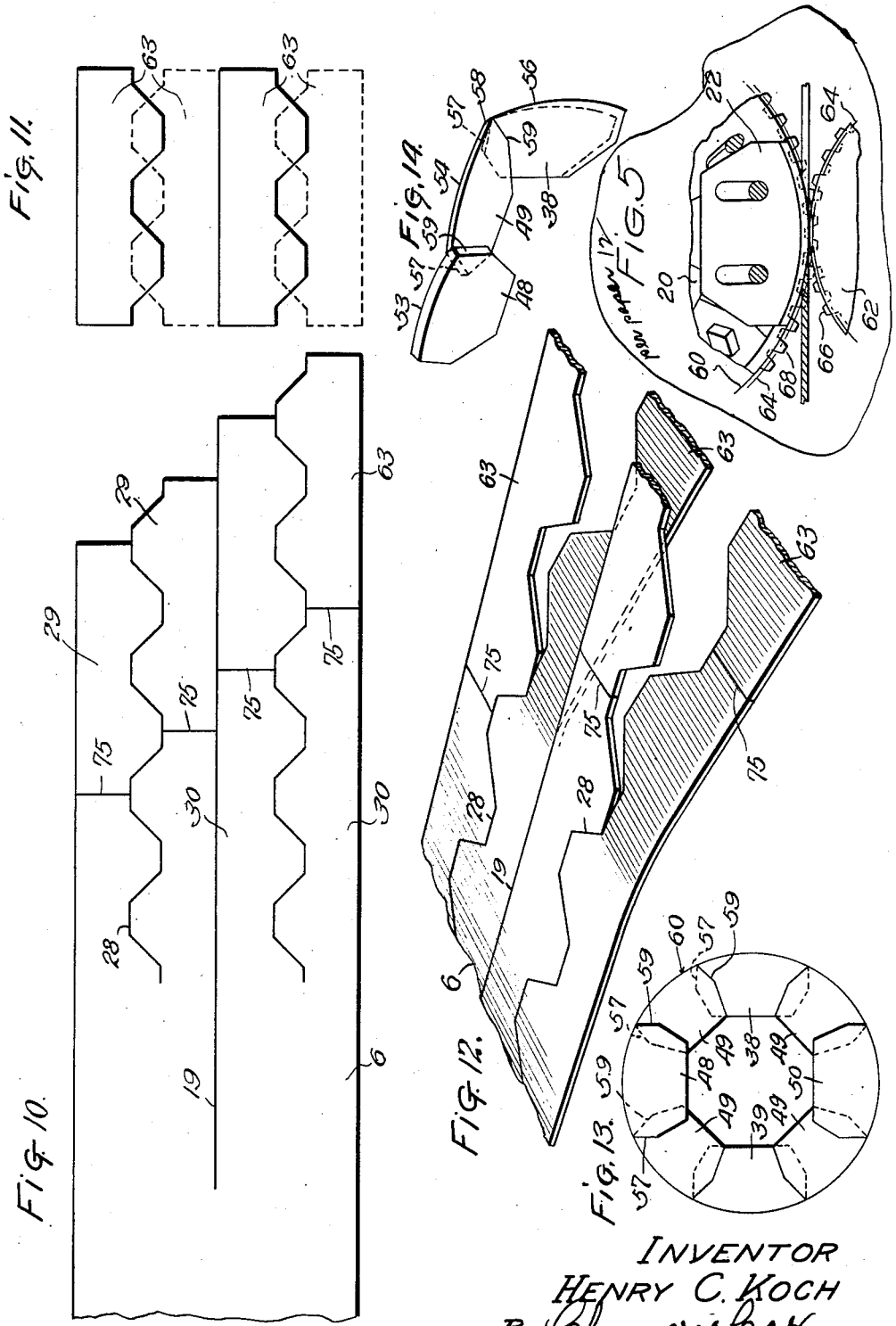

Oct. 13, 1931.                    H. C. KOCH                    1,826,889
                                 CUTTER HEAD
                  Original Filed Dec. 31, 1926    3 Sheets-Sheet 3
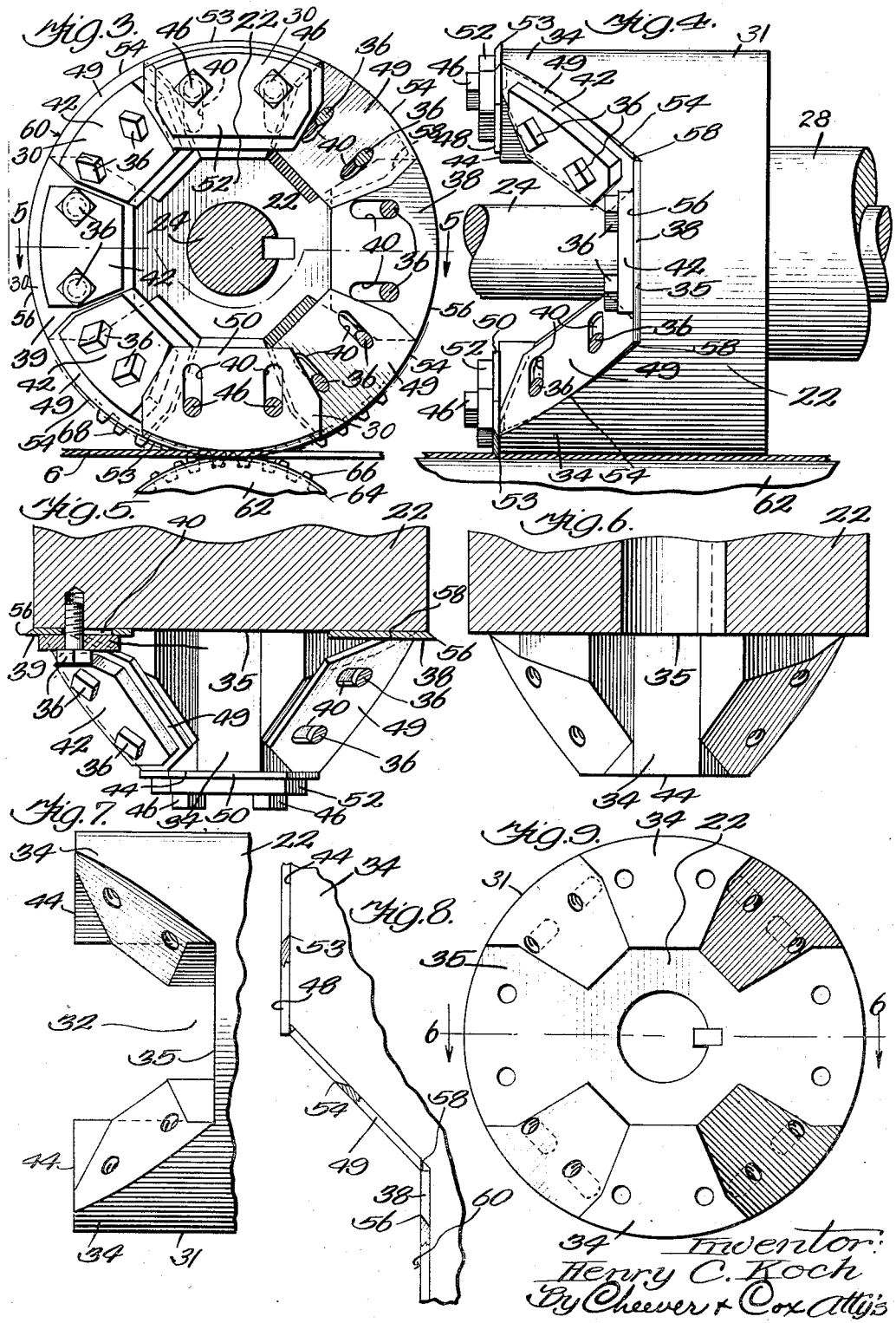

Patented Oct. 13, 1931

1,826,889

UNITED STATES PATENT OFFICE

HENRY C. KOCH, OF CHICAGO, ILLINOIS

CUTTER HEAD

Original application filed December 31, 1926. Serial No. 158,354. Divided and this application filed March 7, 1928. Serial No. 259,770.

This invention relates in general to machines for cutting individual shingles from a continuous strip of asphalt roofing material, such as treated felt and the like, and it relates particularly to cutter heads for said machines.

This application is a division of application, Serial No. 158,354, filed December 31, 1926.

The primary object of the present invention is to provide a cutter head for an apparatus for making shingles from prepared roofing, which is removably and adjustably mounted relative to the bed of the machine to permit a strip to be cut exactly in equal widths along vari-directional lines, according to a predetermined design, regardless of the width of the strip.

Another object is to provide a cutter head for an apparatus for making shingles from prepared roofing, which has a plurality of removably and adjustably mounted knives or blades arranged thereon to permit the knives or blades to be adjusted radially to overcome wear and to permit removal of the blades for sharpening.

A further object is to provide an improved cutter head which is adjustably mounted relative to the machine, and which has adjustable and removable knives arranged thereon for cutting shingles from a strip of treated felt in such a manner that the shingles will all be of the same size and shape.

A still further object is to provide a cutter head for an apparatus for making shingles from treated felt, which will cut a strip of felt into strips having interlocking projections and valleys, which has overlapping blades for cutting the strip along a vari-directional or designed line, and which has removable and adjustable blades, whereby the wear of the blades of the cutter head may be compensated with a minimum amount of effort.

Still another object is to provide a cutter head having a plurality of double cutting blades arranged in overlapping relation in such a manner as to provide a continuous or endless cutting edge to cut individual shingles from a strip, in accordance with a predetermined design.

Numerous other objects and advantages will appear throughout the progress of the specification.

The invention comprises in general a pair of cutter heads which are slidably mounted on a transverse rotary shaft. A set screw is provided in a journal of the cutter head for rigidly securing the cutter head to the shaft to permit sliding movement of the heads on the shaft during operation of the machine. By having the cutter head slidably mounted on the shaft, a strip of treated felt, regardless of its width, may be cut in equal widths along vari-directional lines by simply sliding the cutter head on the shaft. A plurality of beveled cutting blades are removably and adjustably fastened to the cutter head in overlapped relation, so that during operation of the machine the heads will continuously cut a strip into predetermined sections along vari-directional lines in accordance with a predetermined design.

The accompanying drawings illustrate a selected embodiment of the invention, and the views therein are as follows:

Fig. 1 is a longitudinal sectional view through a shingle cutting apparatus and having the invention applied thereto.

Fig. 2 is a top plan view of the apparatus shown in Fig. 1.

Fig. 3 is a detail sectional view on the line 3—3 of Fig. 2 showing the cutter head.

Fig. 4 is a side view of the cutter head, as shown in Fig. 3.

Fig. 5 is a detail sectional view on the line 5—5 of Fig. 3.

Fig. 6 is a similar view on the line 6—6 of Fig. 9.

Fig. 7 is a detail elevation of the cutter head shown in Fig. 6.

Fig. 8 is a diagrammatic view showing the overlapping arrangement of the cutting blades or knives.

Fig. 9 is a front view of the cutter head shown in Fig. 6.

Fig. 10 is a diagrammatic view showing the manner in which a strip of roofing material is cut along a vari-directional line, according to a predetermined design.

Fig. 11 is a diagrammatic view showing the manner in which the severed shingles may be stacked after they are discharged from the cutting apparatus.

Fig. 12 is a perspective view of the severed strip illustrating the relative positions of the severed portions as they pass to divergent paths.

Fig. 13 is a diagrammatic view showing the overlapping arrangement of the design cutter blades or knives.

Fig. 14 is a diagrammatic view showing the manner of overlapping the blades, whereby one of the rear faces of an overlapped portion of one of the blades chamfer to permit the disposition of the cutting edges in a practically continuous line.

The apparatus shown in the accompanying drawings comprises a suitable supporting frame 2 having a bracket 4 attached thereto, which carries a roll of asphalt roofing material or treated felt 6. This material is preferably in the form of a continuous strip and is fed through a plurality of opposed feed rolls 8, which are mounted on top of the supporting frame. These feed rolls are driven by means of a chain of intermeshing gears 10 which are located at the side of the frame 2 and are driven from a source of belt driven power 12.

A slitter 14 is mounted on a transverse shaft 16 which is rotated by means of a gear 18 meshing with a gear of the chain of gears 10. This slitter is arranged between the front feed roll 8 and the roll of roofing material 6 to slit the strip of material along the line 19, forming two separate smaller strips. Cutter heads 20 and 22 are keyed to a transverse shaft 24 and rotate therewith. This shaft is suitably mounted on the frame 2 and is provided with a gear 26 which has meshing relation with the chain of gears 10 for rotating the shaft. A set screw 27 threadedly engages a collar 27' which is connected to end cutter heads 20 and 22 to prevent sliding movement of the cutter heads on the shaft 24 during the cutting operation.

A plurality of blades or knives are adjustably and detachably fastened to the heads 20 and 22 to sever each of the smaller strips along the vari-directonal lines 28 to divide each of the smaller strips into two complementary strips 29 and 30 respectively. The blades are arranged in the heads to design cut the strips in any desired formation. In the present embodiment, the edges of the strips are provided with approximately zigzag cuts substantially in the form of truncated angles. These cutters are arranged to cut each of the smaller strips simultaneously and form the edges of the two strips 29 and the two strips 30 with the illustrated design shown in Fig. 10. This design is a substantially zig-zag line with the points cut off and the valleys partly filled up, the projections and depressions alternating, the projections of one strip filling the valleys or depressions of the other complementary strip. The particular design of the edges may be curved or of any other design desired and, while the term "zig-zag" is used throughout the specification, it is to be understood that this term includes any equivalent design.

The cutter heads 20 and 22 illustrated in detail in Figs. 3 to 9 inclusive are exactly alike, and each head comprises a cylindrical drum portion 31 which is adapted to form a strip feeding member. This drum 31 is cut out or recessed at one end, Figs. 7 and 9, to provide reentrant cut-outs 32 and projections 34 which alternate around the circumference of the drum at such end. The facial walls of these projecting and depressed portions are arranged to receive the cutting blades. In the present cutter head, the blades are disposed with their cutting edges projecting outwardly and extending slightly beyond the periphery of the drum so as to form a line of cut as the drum rotates. While as hereinbefore stated, the blades may be arranged on the drum so as to form any desired line of cut; in the present instance the blades are arranged at an angle to each other. Each adjacent blade lies in a different plane and they are arranged in pairs diametrally of the drum, the blades of each pair being in the same plane. In the particular form illustrated the inner face 35 of a cut-out 32, Figs. 7 and 9, forms a blade seat and is provided with threaded apertures to receive bolts or fastening members 36 for holding a blade 38 in place, Figs. 3 to 5. This blade, like all of the blades, is provided with elongated slots 40 to permit the blade to be adjusted outwardly, preferably radially of the drum, as when the blade becomes worn after use. A plate 42, Figs. 4 and 5, holds the blade in position.

A blade 39, Figs. 3 and 5, for the diametrally disposed depressions is identical in all respects both in shape and arrangement on the drum. The only difference resides in its manner of overlapping arrangement with respect to its adjacent blades. In somewhat similar manner the lateral faces of the projections 34 of this drum are provided with threaded perforations to receive fastening bolts 46, Figs. 3 and 4, for holding the blades in position on such faces. For instance, blade 48 and its diametrally disposed blade 50, are also slotted and are clamped in position by means of plates 52 through the intermediary of the bolts 46. This construction permits the outward adjustment of these blades to take up wear. Those blades which lie between the blades 38 and 39 which are mounted on the front walls of the depressions, and the blades 48 and 50 which are mounted on the front faces of the projections, are disposed in diagonal planes, or in other words, are disposed at an angle to the planes of the blades 38, 39, 48 and 50. This is clearly illustrated in Fig. 8 of the drawings. The present arrangement of blades forms an endless series of truncated triangles to be cut into the strips hereinbefore mentioned. Also, the novel disposition of the blades with respect to their beveled edges permits the blades to be formed into a continuous or endless cutting edge. All of the blades are of appreciable thickness in order to cut the treated felt, and therefore beveled edges are provided for the blades.

In order to form an endless or continuous cut in the felt as the design cutter drum rotates, the blades are arranged in overlapping relation, their adjacent edges or sides overlapping. The blades are also arranged so that the cutting edge of one blade is disposed adjacent or contiguous the cutting edge of the next overlapping adjacent blade. For instance, in Fig. 8 the uppermost blade 48 has the cutting edge 53 of its beveled edge disposed toward the right of the sheet. The next adjacent blade 49 which overlaps it as its edge has its cutting edge 54 facing adjacent or contiguous to the cutting edge 53 so that the two cutting edges 53 and 54 are practically continuous, although angularly disposed with respect to each other. The next blade 38 which is the bottom blade shown in Fig. 8, has its cutting edge 56 facing the left of the sheet of drawings, but since the cutting edge 54 of the central blade shown in Fig. 8 also faces to the left of the figure, and since the two lower blades are also arranged in overlapping relation at their sides, it is necessary to chamfer the rear edge of blade 49 at 58, so that the blade 38 may be arranged in overlapping relation with cutting edge 56 disposed in line or contiguous with cutting edge 54 of blade 49. The remaining blades of the closed or endless or continuous series are arranged in similar manner—with their sides overlapping and with a rear face of an overlapped blade chamfered at desired intervals according to the necessity of the position. These diagonally disposed blades are also arranged in diametrally disposed pairs, the blades of each pair being in the same plane. By means of this arrangement any two adjacent blades are in different planes completely around the closed series of blades. Each of these blades is mounted similarly to the blades 38, 39, 48 and 50, so that they can be adjusted outwardly for wear adjustment.

As previously mentioned, both of the cutter heads are alike in all respects except the cutter head 20 is reversely arranged on shaft 24 from the cutter head 22 just described. These two design cutter heads are disposed preferably, but not necessarily exactly, intermediate the width of the smaller or half-strips formed by the slitter so as to provide four strips identical in dimensions and shape.

In the constant cutting of this treated felt, the cutters become quite dull and must be sharpened which necessitates an adjustment of the resharpened cutters due to wear in the sharpening operation. Some provision must be made for compensating for this wear and for preserving the continuous or endless line of cutting edge and also for maintaining the overall length of this endless cutting edge after the adjustment of the sharpened cutters is made. Otherwise the shingles will not be of uniform size; smaller shingles will be cut. It is of extreme importance that shingles all be of uniform size because if laid in a roof they must match; otherwise they will not fit.

In the present invention means are provided for accomplishing these results by arranging the blades in overlapping relation to form a closed, endless or continuous series, the overlapped sides having their adjacent edges converging inwardly as at 57 and 59 and meeting at the endless or continuous cutting edge 60 of the series of blades. Thus, when all of the blades are resharpened and are adjusted outwardly, radially, the blades may be disposed in overlapping relation to form an endless cutting edge of an overall length identical with that prior to the sharpening of the blades. This is an important feature of my invention, and is illustrated diagrammatically in Figs. 13 and 14 of the drawings.

A roller 62 which acts as a reactive platen is revolvably mounted in the frame 2 and is located below the cutter head 22 and has contacting relation therewith. The strip of treated felt or roofing material passes between the cutter heads 20 and 22 and the roller 62 and assists in feeding the strip along. The roller 62 forms a surface or backing for the blades as the heads rotate and cut the traveling strip of felt. The cutter head 22 is geared to the roller 62 to rotate the same, and as the gears are different in size than the roller platen 62 and the drum 31, a fresh surface is constantly being presented to the cutting blades during successive rotation of the cutter heads. This arrangement causes the peripheral speed of the drum to be different than the peripheral speed of the platen 62. However in the present instance the gears are only slightly different in proportion relative to the drum and platen, so that the slipping action between these two members is very slight.

After the two strips 29 and the two strips 30 have passed the cutter heads 20 and 22 in their passage through the machine, they are cut into a succession of separate shingles 63 by means of end cutters. These end cutters are mounted on a cross-shaft 70 and driven from the gears 72. These end cutters comprise four blades arranged across the width of the machine, one for each of the strips. These blades are mounted on rotary arms 74 and are staggered across the machine so as to operate in succession on the adjacent strips. This staggered arrangement of the end cutter blades cuts each complemental strip transversely along the lines 75, Figs. 10 and 12, at the point where the interlocking or complemental projections and cut-outs are arranged in staggered relation longitudinally of the felt strip.

The conveyers are arranged to complete the severance of any incompletely cut strips. The successive belts are arranged in divergent paths, whereby the adjacent strips are shifted laterally and separated. These belts are arranged so that they diverge into different planes disposed horizontal of the machine, and permit the successive shingles of adjacent strips to be facilely stacked with their ends coterminous. Due to the locking of the alternate projections and depressions which extend longitudinally of the strip, the separate shingles may be moved along paths of equal length to stacking stations, if alternate strips are moved along lowered and raised paths, such as shown in Fig. 12. In carrying out this arrangement, the first and third belts are inclined downwardly, leaving the second and fourth belts in the horizontal plane of the machine. The free ends of the downwardly inclined belts have their ends disposed adjacent the lower stacking rack, and the outer ends of the upper belts have their free ends adjacent the upper stacking racks. In this manner the successive shingles of adjacent strips can be carried to the stacks and piled, their ends coterminous without interruption and without increasing the length of the conveyer belts, as would be necessary if the belts were diverged laterally. Pressure rollers are also supplied to accelerate the cut shingles to divergent paths. The foregoing is clearly disclosed in the aforesaid co-pending application, Serial No. 158,354, filed December 31, 1926.

The invention provides an apparatus for forming cut shingles from a continuous strip of prepared roofing material, such as treated felt and the like. In the present device the single strip of felt passes continuously from a supply roll, fed along at a constant rate of speed and formed into a plurality of strips of identical design by means of a single slitter and a pair of design cutters. The cutter heads are slidably mounted on a shaft, so that four strips of equal size may be cut from a relatively wide roll of treated material, regardless of its width.

Changes may be made in the form, construction and arrangement of the parts without departing from the spirit of the invention or sacrificing any of the advantages thereof, and the right is hereby reserved to make all such changes as fairly fall within the scope of the following claims.

I claim:

1. An apparatus for making shingles from moving strips of shingle material, comprising a rotating drum mounted adjacent the line of feed of said strip and carrying a plurality of blades arranged with their cutting edges forming a continuous cutting edge around the drum, means for adjusting said blades radially to compensate for wear during sharpening, said blades having their sides overlaping and constructed and arranged to maintain their original length and continuous character of said cutting edge when adjusted to take up wear.

2. In an apparatus for forming shingles from moving strips of shingle material, comprising a rotating drum disposed adjacent the path of movement of the strip, a plurality of contiguous adjustably mounted blades disposed on said drum and arranged at an angle to each other, said blades being arranged with their cutting edges adjacent so as to form a continuous cutting edge of predetermined length around the drum, means for adjusting said blades to take up wear, some of said blades overlapping other of said blades, the adjacent edges of said blades meeting to form a continuous cutting edge.

3. A cutter head for forming shingles from treated felt or the like, a rotatable drum mounted adjacent the felt, a plurality of beveled-edged blades circumferentially mounted thereon, adjacent blades being in different planes, said blades overlapping, the cutting edges of said blades being continuous, one face of an overlapped portion of one blade being chamfered to permit the cutting edges of the blades to form a practically continuous cutting edge.

4. An apparatus for cutting shingles from moving strips of roofing material, comprising a rotatable drum disposed adjacent the path of movement of the felt, a plurality of radially adjustable angularly disposed blades arranged on said drum so that any two adjacent blades will be in different planes, said blades having beveled edges and disposed so that the cutting edges of adjacent blades form a continuous cutting edge without breaks between the blades.

5. An apparatus for cutting shingles from a strip of shingle material, comprising a rototable drum disposed adjacent the path of movement of the material, a first beveled edge blade thereon having its cutting edge set in one direction, a second beveled-edge blade on said drum and disposed at an angle to said first blade with its side overlapping that of the first blade, the cutting edge of said second blade lying in contact with that of the first blade, a third beveled-edge blade on said drum adjacent said second blade and disposed at a different direction than either the first or second blades, said third blade having its side overlapping the side of said second blade and having its cutting edge adjacent the cutting edge of said second blade whereby the cutting edges of said three blades will be continuous.

6. A cutter head for a shingle forming apparatus comprising a rotary mounted drum, and radially adjustable blades mounted on said drum and having their cutting edges extending therefrom, said blades being circumferentially arranged about said drum at an angle to the circumference of said drum and to each other.

7. An apparatus for making shingles from composition shingle material comprising a shaft, a cutter head removably and slidably mounted on said shaft, means for fastening said head to said shaft, and angularly disposed radially adjustable blades fastened to an end wall of said head.

8. An apparatus for making shingles from composition shingle material comprising a shaft, means for rotating said shaft, a plurality of cutter heads removably mounted on said shaft, means for fixing said heads to said shaft to cause said heads to rotate with the shaft, and removable radially adjustable blades mounted on said heads, the blades on each head being contiguous to form a continuous cutting edge.

In witness whereof, I have hereunto subscribed my name.

HENRY C. KOCH.